(12) United States Patent
McCord

(10) Patent No.: US 6,588,059 B1
(45) Date of Patent: Jul. 8, 2003

(54) SNAP-FIT PLASTIC CASTER

(75) Inventor: Robert C. McCord, Florence, MA (US)

(73) Assignee: Standex International Corp., Salem, NH (US)

( * ) Notice: Subject to any disclaimer, the term of this patent is extended or adjusted under 35 U.S.C. 154(b) by 0 days.

(21) Appl. No.: 09/966,977

(22) Filed: Sep. 27, 2001

(51) Int. Cl.[7] .............................................. B60B 33/00
(52) U.S. Cl. ........................ 16/30; 16/40; 16/31 R; 16/18 R
(58) Field of Search ...................... 16/30, 18 R, 29, 16/38, 31 R, 40, 43

(56) References Cited

U.S. PATENT DOCUMENTS

| | | | |
|---|---|---|---|
| 627,108 A | 6/1899 | Fishel | |
| 1,395,484 A | 11/1921 | Diss | |
| 1,559,078 A | 10/1925 | Everly | |
| 4,054,964 A * | 10/1977 | Kaneko | 16/20 |
| 4,348,784 A * | 9/1982 | Fontana | 16/21 |
| 4,509,227 A | 4/1985 | Keane | |
| 4,530,543 A * | 7/1985 | Keane | 15/327.1 |
| 4,554,704 A * | 11/1985 | Raffaeli | 16/18 R |
| 4,653,139 A * | 3/1987 | Vollberg et al. | 16/20 |
| 4,897,895 A | 2/1990 | Wang | |
| 4,953,257 A | 9/1990 | Seynhaeve | |
| 5,143,500 A | 9/1992 | Schuring et al. | |
| 5,199,131 A * | 4/1993 | Harris | 16/18 R |
| 5,361,454 A | 11/1994 | Sumser et al. | |
| 5,390,394 A | 2/1995 | Huang | |
| 5,408,723 A | 4/1995 | Julien et al. | |
| 5,568,671 A * | 10/1996 | Harris et al. | 16/18 R |
| 5,594,974 A * | 1/1997 | Wattron et al. | 16/30 |
| 6,047,439 A * | 4/2000 | Stearn | 16/20 |

* cited by examiner

Primary Examiner—Gary Estremsky
Assistant Examiner—Mark Williams
(74) Attorney, Agent, or Firm—McCormick, Paulding & Huber LLP

(57) ABSTRACT

A plastic caster has two legs for mounting a wheel(s) and a fork assembly with a bearing housing portion formed around a bearing assembly with inner and outer ring-shaped raceways and bearings evenly dispersed in a cage between the inner and outer raceways. A top-plate has an extension which extension engages the inner raceway permitting the top plate and fork assembly to independently rotate about the second axis. A retention plug is mated with an opening in the extension preventing disengagement of the top-plate from the inner raceway thereby securely attaching the top-plate to the inner raceway.

19 Claims, 3 Drawing Sheets

SNAP-FIT PLASTIC CASTER

FIELD OF THE INVENTION

The present invention relates to swivel wheel casters, and in particular to a plastic swivel wheel caster having a plastic fork assembly formed around a bearing assembly with a top-plate engaging the bearing assembly held securely in place by a retention plug inserted into the top plate through the bearing assembly.

BACKGROUND OF THE INVENTION

Caster wheel assemblies are well known in the prior art and have been widely used on very diverse apparatuses. Casters are found on weight bearing legs of tables, chairs, and other furniture. They are found on the bases or undersides of flat bottomed furniture such as bookshelves, television, and entertainment stands. Casters are also found on baby carriages, carts, and moving equipment. Unfortunately, caster assemblies frequently get fouled by grit, dirt, hair and other particles in the environment. These particles result in substantial wear and tear leading to caster wheel assembly breakdown. Also, caster assemblies frequently break or fall apart.

Conventional casters include wheel assemblies having a cylindrical extension which rotatably engages a hollow tubular sleeve disposed on a weight bearing leg of an apparatus, wheel assemblies having openings or hollow sleeves for rotatably receiving a cylindrical extension disposed on an apparatus, and similar modifications thereof. Numerous examples of such apparatuses are found in the patent literature including U.S. Pat. No. 1,559,078 issued to Everly (a caster wheel assembly having a fork with a cylindrical extension disposed opposite the wheel and rotatably engaged in a hollow sleeve inserted in the leg of a piece of furniture), U.S. Pat. No. 5,390,394 issued to Huang (a detachable front wheel assembly having a frame attachment member with a hollow sleeve for rotatably receiving a tubular extension disposed opposite the wheels for use as the front wheel assembly of a stroller), U.S. Pat. No. 5,408,723 issued to Juliean et al. (a swivel wheel assembly having a tube plug—hollow sleeve—inserted in a hollow leg for receiving a pin rotatably engaged in a rotary member having wheels attached thereto), U.S. Pat. No. 5,361,454 issued to Sumser et al. (a snap-on swivel wheel assembly having a wheel supporting unit with a hollow tube sleeve for rotatably receiving a tubular sleeve having a bottom with an opening and a fastener attaching the two sleeves together; the tubular sleeve in turn rigidly receives a weight bearing leg of a baby carriage), and U.S. Pat. No. 4,897,895 issued to Wang (a caster device having a wheel supporting fork with a hollow tube sleeve for rotatably receiving a tubular sleeve having flexible detents to prevent separation which tubular sleeve in turn rigidly receives a weight bearing leg of a baby carriage).

It is also known in the art to use ball bearings in caster wheel assemblies. U.S. Pat. No. 5,199,131 issued to Harris teaches a caster assembly having a stem and ball bearing retainer made of a single homogeneous unit of reinforced plastic, a horn made of a single piece of reinforced plastic, a bottom bearing retainer made of a single piece of reinforced plastic, an upper set of ball bearings between the horn and the upper retainer, a lower set of ball bearings between the horn and the bottom retainer, with the bottom retainer being ultrasonically welded to the unitary stem and retainer. Similarly, U.S. Pat. No. 627,108 issued to Fishel describes a caster assembly which utilizes exposed ball bearing sets. The ball bearing sets of these inventions are not protected from environmental factors, may become entangled with debris, and therefore, are susceptible to heightened wear and tear which reduces the overall life span the caster assembly.

Other bearings have also been used with casters. U.S. Pat. No. 4,653,139 issued to Vollberg et al. discloses a caster with a plain thrust bearing between the wheel frame and the frame carrier. The invention therein has a bifurcated frame for the wheel and the carrier which defines a plain thrust bearing, and allows the frame to swivel relative to the carrier about an axis extending at right angles to the axis of the wheel. A ring-shaped coupling prevents the separation of the frame and carrier whose abutting surfaces are engaged by the ring-shaped coupling.

Other prior art inventions utilize posts and the like which engage part of the caster assembly and are held in place by flanges, retainer rims, and other devices but do not make use of ball bearings. U.S. Pat. No. 4,509,227 issued to Keane discloses a three-piece swivel caster having a force transfer roller which has a mounting portion with a post that engages a base and is held therein by flanges. Keane does not disclose the use of a plug to insure that the post does not disengage from the base. Also, U.S. Pat. No. 4,953,257 issued to Seynhaeve describes a caster wheel having a means for capturing and holding a rim by use of a brace snapped into the bore of the rim which is mated with an axis that prevents separation. Furthermore, U.S. Pat. No. 1,395,484 issued to Diss describes a caster wheel having a means for capturing and holding a rim by use of a U-shaped retainer spring strip but the caster slidably rotates. All three of these inventions do not use ball bearings but are instead slidably engaged in a retainer mechanism.

Snap engaging fastener systems for providing rotary motion are also known in the art, as shown in U.S. Pat. No. 5,143,500 issued to Schuring et al. Schuring et al. discloses a fastener system having a stud element with a split or bifurcated head, forming two prongs, that fits inside a socket sleeve. The socket sleeve and stud element are thereby slidably engaged to permit rotation but not disengagement. The invention of Schuring et al. does not disclose the use of ball bearings.

None of the above inventions and patents, taken either singularly or in combination, is seen to describe the instant invention as claimed.

SUMMARY OF THE INVENTION

An object of the present invention is to provide a snap-fit caster wheel assembly which is lighter than conventional casters which are predominantly fashioned from metals and is sturdier than prior art plastic casters. The present caster wheel assembly is composed predominantly of plastic and therefore is much lighter than conventional casters but its configuration is much sturdier.

Another object of the invention is to provide a snap-fit caster wheel assembly which limits hair, grit or other particles from getting trapped in the wheel assembly and thereby assuring free horizontal rotation of the fork and wheel of the caster assembly.

Yet another object of the present invention is to provide a snap-fit caster wheel assembly which is designed to last for the life of the apparatus to which the caster is attached. The bearing assembly of the present invention, which facilitates the horizontal rotation, is protected from environmental exposure and has few parts. These qualities assure a longer life for the wheel assembly.

The present invention relates to a plastic caster comprising a fork assembly having a bearing housing portion, at least one prong rigid with the housing portion with at least one wheel mounted on the prong for rotation about a first axis. The bearing housing portion is formed around a bearing assembly. The bearing assembly has inner and outer ring-shaped raceways, preferably with bearings evenly dispersed in a cage between the inner and outer raceways. The housing portion is formed such that the outer raceway is securely affixed to the housing portion while the inner raceway rotates freely about a second axis which is substantially normal to the first axis. The housing portion further comprising a first surface which is remote from the first axis.

A top-plate has a second surface which abuts the first surface. The top-plate has an extension extending from the second surface with an opening therein. The extension engages the inner raceway permitting the top plate and fork assembly to independently rotate about the second axis. A retention plug is mated with the opening of the extension preventing disengagement of the top-plate from the inner raceway to securely attaching the top-plate to the inner raceway.

An advantage of the invention is to provide a caster wheel assembly having fewer parts than commonly found in casters. The present caster has only three separate parts therefore assembling the present caster is easier than assembling casters with more parts.

Another advantage of the present invention is that it does not fall apart easily, and will remain intact for a long time. Conventional casters have the unfortunate disadvantage of coming apart and bending requiring replacement. The present casters are unlikely to come apart and cannot bend as metal casters do.

These and other objects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF PREFERRED EMBODIMENTS

A plastic caster 12, according to the present invention, has a fork assembly 14, a top-plate 16 and a retention plug 18.

Figure 1:
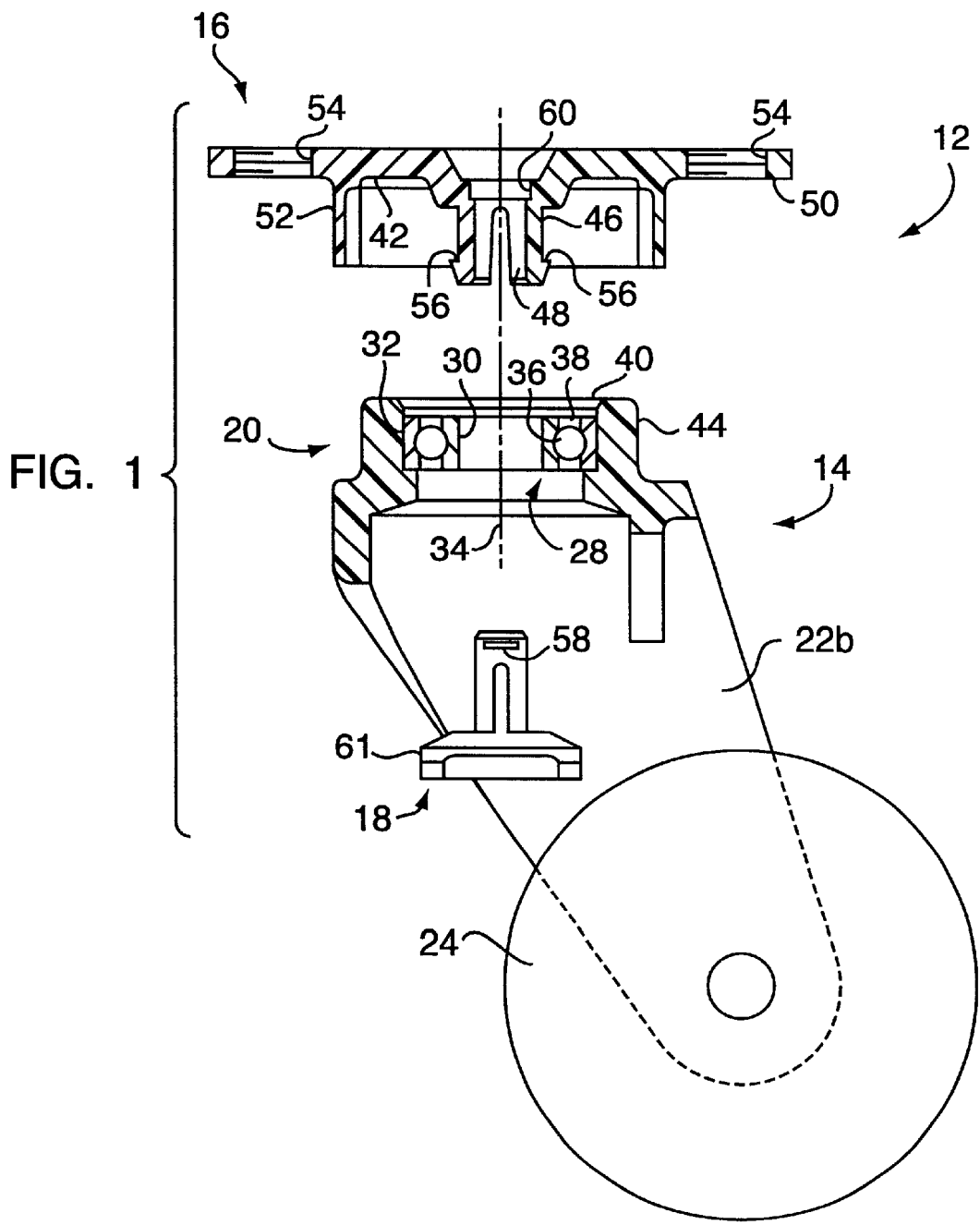
FIG. 1 is a side section view of a wheel caster according to the present invention showing a fork assembly, top-plate, and retention plug of the wheel caster disengaged from one another.
Figure 2:
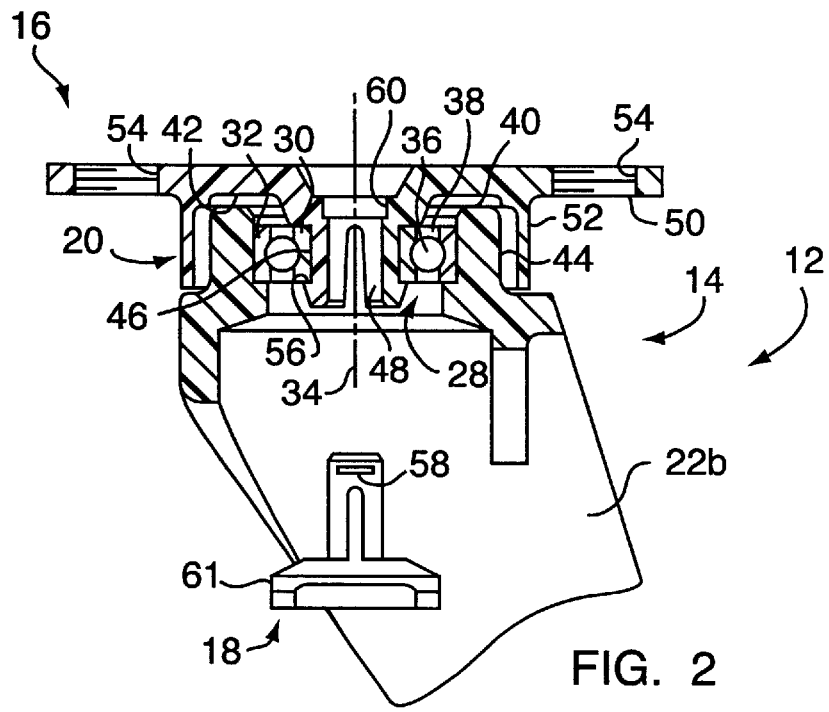
FIG. 2 is a partial side section view of the top part of the wheel caster according to FIG. 1 having the top-plate engaged on the fork assembly with the retention plug separated therefrom.
Figure 3:
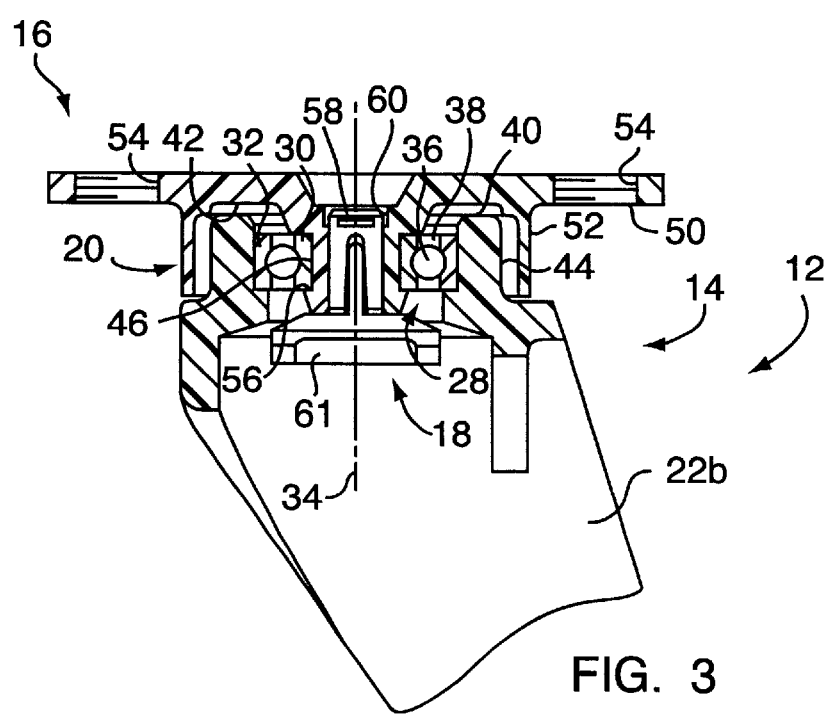
FIG. 3 is a partial side section view of the wheel caster according FIG. 2 having the retention plug engaged in the top-plate.
Figure 4:
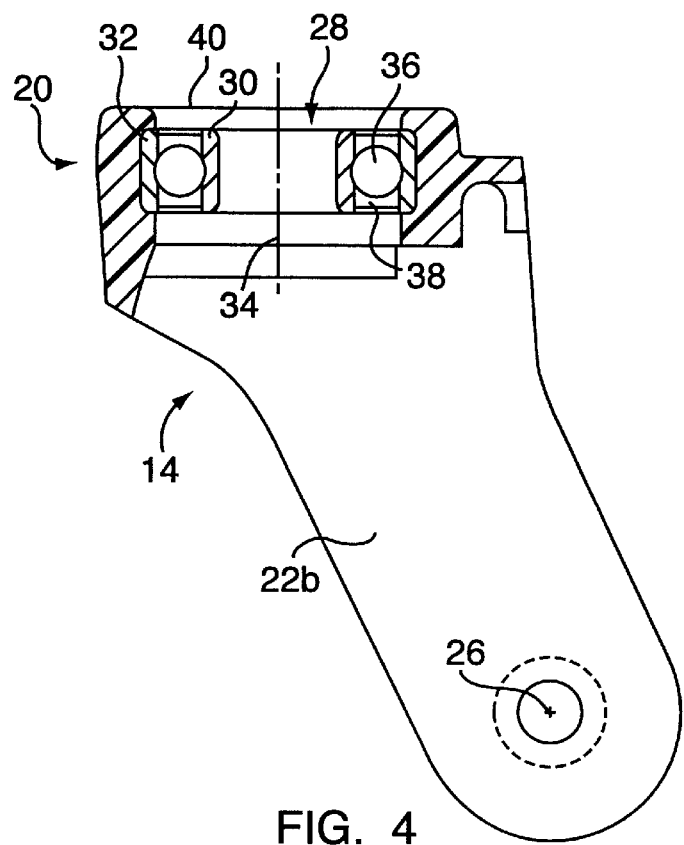
FIG. 4 is a side section view of an alternate fork assembly of the present invention.
Figure 5:
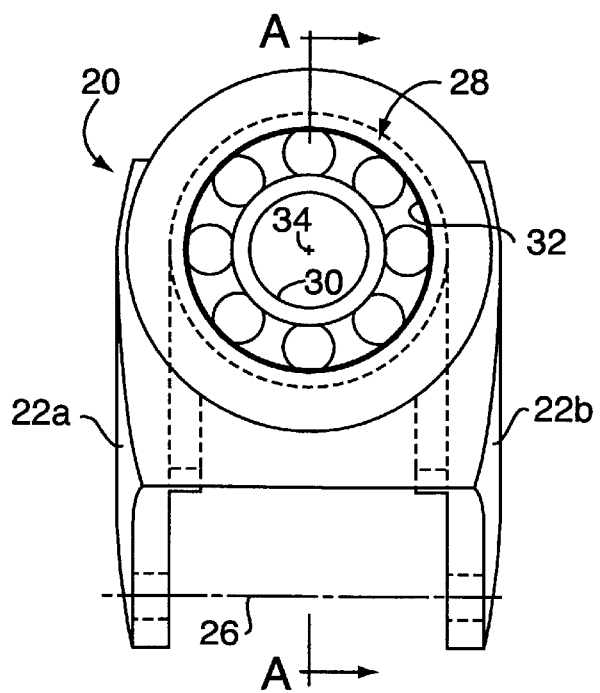
FIG. 5 is a top view showing a ball bearing assembly formed in a bearing housing portion of the fork assembly shown in FIG. 4.

FIGS. 1–3 show a first embodiment of the plastic caster 12. FIGS. 4–5 show a slightly different embodiment of the present invention. FIG. 1 shows the plastic caster 12 with the fork assembly 14, top-plate 16 and retention plug 18 separated to illustrate the structure of each. FIG. 2 shows the fork assembly 14 and top-plate 16 assembled with the retention plug 18 separated to illustrate the cooperative arrangement of the fork assembly 14 and top-plate 16. FIG. 3 shows the fork assembly 14, top-plate 16 and retention plug 18 assembled to illustrate the cooperative arrangement thereof. The fork assembly 14, top-plate 16 and retention plug 18 are preferably molded out of a resilient plastic.

The fork assembly 14 has a bearing housing portion 20 and legs 22a and 22b, rigid with the housing portion 20. At least one wheel 24 is mounted between the legs 22a and 22b, for rotation about a first axis 26, as shown in FIG. 5. The primary difference between the two embodiments depicted in the figures is the shape of the legs 22a and 22b, as can be seen in FIGS. 1 and 4.

The bearing housing portion 20 is formed around a bearing assembly 28. The bearing assembly 28 has an inner raceway 30 and an outer raceway 32, as can be seen most clearly in FIGS. 4 and 5. The raceways 30 and 32 are ring-shaped preferably with bearings evenly dispersed in a cage 38 between the inner and outer raceways 30 and 32. The housing portion 20 is formed such that the outer raceway 32 is securely affixed to the housing portion 20 while the inner raceway 30 is free to rotate about a second axis 34. The second axis 34 is substantially normal to the first axis 26. The cutaway A—A shown in FIG. 5 indicates the direction of the sectional view of FIG. 4.

As used herein, the term "bearing assembly" refers to an assembly having ring-shaped inner and outer raceways which rotate freely relative to one another about a single axis but are not separable from each other. The preferred bearing assembly 28 is an assembly having a plurality of balls 36, as shown in the figures, or rollers (not shown) disposed in a cage 38 between the inner and outer raceways 30 and 32. As is well known in the art, the bearing assembly may include lubricant and a bearing shield, and may be rubber sealed. The terms "ball bearing", "roller bearing" and "bearing", as used herein, refer solely to the individual balls or rollers incorporated into a bearing assembly.

The bearing assembly may have slanted raceways or vertical parallel raceways 30 and 32, as shown in FIGS. 1–4. Conventional thrust bearing, taper bearing, precision bearing and radial bearing assemblies having inner and outer raceways, which may utilize either ball or roller bearings, are also contemplated by the present invention. The bearing assembly may have a bearing shield disposed across the bearings. A thin coating of lubricant may be present on the bearings or between the inner and outer raceways. Alternatively, the bearing assembly may be lubricant free. The bearing assembly 28 may have metal or ceramic components, as is well known in the art.

The bearing housing portion 20 has a first surface 40 which is remote from the first axis 26, as shown most clearly in FIG. 4. The top-plate 16 has a second surface 42 which, when the fork assembly 14 is engaged by the top-plate 16, slidably abuts the first surface 40. The housing portion 20 may have a cylindrical shaped side 44 adjacent the first surface 40 and extending parallel to the second axis 34. The second surface 42 preferably extends beyond the first surface 40 forming a protruding edge 50. The top-plate 16 may also have a lip 52 which slidably envelopes the cylindrical shaped side 44 of the housing portion 20, and bisects the second surface 42 from the protruding edge 50, if a protruding edge 50 is present.

The top-plate 16 has an extension 46 extending from the second surface 42 which engages the inner raceway 30. In other words, the extension 46 attaches the top-plate 16 to the inner raceway 30 thereby permitting the top-plate 16 and fork assembly 14 to independently rotate about the second axis 34. The extension 46 has an opening 48 therein for receiving the retention plug 18 which is mated with the opening 48 to prevent disengagement of the top-plate 16 from the inner raceway 30 thereby securely attaching the top-plate 16 to the inner raceway 30. The extension 46 of the top-plate has a bifurcated cylindrical tube shape with a shoulder 56 extending circumferentially about the extension 48 opposite the second surface 42 of the top-plate 16, as shown in FIG. 1. When the extension 46 is engaged with the inner raceway 30 the shoulder 56 extends opposite the second surface 42 securing the top-plate 16 to the inner raceway 30. The top-plate 16 snaps into position upon being engaged into the inner raceway 30. The retention plug 18 may have a ridge 58 engaging a complementary channel 60 in the opening 48 of the extension 46 for securely retaining the retention plug 18 in the opening 48. Also, the retention plug 18 preferably has a circular base 60 which extends past the shoulder 56 of the extension 46.

The top-plate 16 may have a means for attaching the top-plate 16 to a support member (not shown), or the top-plate 16 may form an integral part of a support member. As used herein, the term "support member" is not limited to the leg of a chair, table, baby carriage or other structure but also encompasses flat surfaces such as the underside of a cart or bookshelf. The means for attaching the top-plate 16 to the support member may include threaded openings 54 and the like designed for receiving screws, rivets, and the like to affix top-plate to a support member.

A method used to produce a fork assembly with a molded-in bearing assembly, according to the present invention, involves injection molding plastic around the bearing assembly thereby forming the fork assembly. This method uses a mold which is constructed to hold and retain a specific bearing assembly in an exact and predetermined position in the mold cavity. Prior to beginning a molding cycle, and while the mold is in an open position, the bearing assembly is loaded, either manually or by robotics, onto a holding device located in the mold. After the mold is closed, and prior to injecting plastic into the cavity and around the bearing assembly, internal mold slides are used to seal any areas on the fork assembly and bearing assembly where plastic is not desired. The internal mold slides prevent the injected hot plastic from contacting and contaminating, or damaging, the ball bearings, cages or raceways on the bearing assembly.

Upon completion of the molding and cooling cycle, the mold is opened and presents the injection molded fork assembly containing a molded-in bearing assembly which has become an integral part of the fork assembly which is actually formed around the bearing assembly. Removal of the molded fork from the open mold can be accomplished by automatic ejection, manual removal or robotics.

It is to be understood that the present invention is not limited to the embodiments described above, but encompasses any and all embodiments within the scope of the following claims.

What is claimed is:

1. A plastic caster comprising:
   a fork assembly having a bearing housing portion, two legs rigid with the housing portion, and at least one wheel mounted between the legs for rotation about a first axis, the bearing housing portion being formed around a bearing assembly, the bearing assembly having inner and outer ring-shaped raceways with bearings, the housing portion being formed such that the outer raceway is securely affixed to the housing portion while the inner raceway rotates freely about a second axis which is substantially normal to the first axis, the housing portion further comprising a first surface which is remote from the first axis;
   a top-plate having a second surface abutting the first surface, an extension extending from the second surface and having an opening therein, the extension engaging the inner raceway thereby permitting the top plate and fork assembly to independently rotate about the second axis; and
   a retention plug mated with the opening of the extension preventing disengagement of the top-plate from the inner raceway thereby securely attaching the top-plate to the inner raceway.

2. The caster of claim 1, wherein the top-plate has means for attaching the top-plate to a support member.

3. The caster of claim 1, wherein the top-plate forms an integral part of a support member.

4. The caster of claim 1, wherein the extension of the top-plate has a bifurcated cylindrical shape with a shoulder extending circumferentially about the extension opposite the second surface of the top-plate such that when the extension is engaged with the inner raceway the shoulder extends opposite the top-plate securing the top-plate to the inner raceway.

5. The caster of claim 4, wherein the retention plug has a circular base which extends past the shoulder of the extension.

6. The caster according to claim 1, wherein the housing portion has a cylindrical shaped side adjacent the first surface and extending parallel to the second axis.

7. The caster according to claim 6, wherein the top-plate further comprises a lip extending parallel to the extension which lip slidably envelopes the cylindrical shaped side of the housing portion.

8. The caster according to claim 1, wherein the retention plug has a ridge engaging a complementary channel in the opening of the extension for securely retaining the plug in the opening.

9. The caster according to claim 1, wherein the second surface extends beyond the first surface forming a protruding edge.

10. A plastic caster comprising:
    a fork assembly having a bearing housing portion, two legs rigid with the housing portion, and at least one wheel mounted on the legs for rotation about a first axis, the bearing housing portion being formed around a bearing assembly, the bearing assembly having inner and outer raceways, the housing portion being formed such that the outer raceway is securely affixed to the housing portion while the inner raceway rotates freely about a second axis which is substantially normal to the first axis, the housing portion further comprising a first surface which is remote from the first axis;
    a top-plate having a second surface abutting the first surface, an extension extending from the second surface and having an opening therein, the extension engaging the inner raceway thereby permitting the top plate and fork assembly to independently rotate about the second axis; and
    a retention plug mated with the opening of the extension thereby securely attaching the top-plate to the inner raceway.

11. The caster according to claim 10, further comprising bearings evenly dispersed in a cage between the inner and outer raceways.

12. The caster of claim 11, wherein the extension of the top-plate has a bifurcated cylindrical shape with a shoulder extending circumferentially about the extension opposite the second surface of the top-plate such that when the extension is engaged with the inner raceway the shoulder extends opposite the top-plate securing the top-plate to the inner raceway.

13. The caster according to claim 12, wherein the retention plug has a ridge engaging a complementary channel in the opening of the extension for securely retaining the plug in the opening.

14. The caster of claim 13, wherein the retention plug has a circular base which extends past the shoulder of the extension.

15. The caster according to claim 11, wherein the housing portion has a cylindrical shaped side adjacent the first surface and extending parallel to the second axis.

16. The caster according to claim 15, wherein the top-plate further comprises a lip extending parallel to the extension which lip slidably envelopes the cylindrical shaped side of the housing portion.

17. The caster according to claim 16, wherein the second surface extends beyond the first surface forming a protruding edge.

18. The caster of claim 10, wherein the top-plate has means for attaching the top-plate to a support member.

19. The caster of claim 10, wherein the top-plate forms an integral part of a support member.

* * * * *